3,483,184
NITROGENATED NATURAL PRODUCTS AND
PROCESSES UNDER ALKALINE CONDITIONS
Ralph Joseph Chamberlain, Glenbrook, Conn., assignor to American Cyanamid Company, Stamford, Conn., a corporation of Maine
No Drawing. Filed Dec. 20, 1965, Ser. No. 515,193
Claims priority, application Great Britain, Mar. 23, 1965, 12,275/65
Int. Cl. C08b *15/06;* C07g *1/00*
U.S. Cl. 260—212      3 Claims

ABSTRACT OF THE DISCLOSURE

Undigested wood is nitrogenated by treating the wood with a cyanamide compound in the presence of an alkaline medium. Wood thus treated exhibits enhanced resistance to paint discoloration resulting from gums and saps exuded by the wood.

---

This invention relates to the nitrogenation of natural products, to a method of stabilizing aqueous dispersions of natural products, and to a method of precipitating blood.

In accordance with the present invention, it has been discovered that certain natural products when treated with a cyanamide compound under alkaline pH conditions are nitrogenated whereby new and useful properties are imparted to such materials. It has further been discovered that aqueous dispersions of several of the foregoing natural products when treated with a cyanamide compound are made resistant to spoilage as evidenced by substantial retention of the initial freshness after extented periods of storage.

The natural products which are nitrogenated by reaction with a cyanamide compound under alkaline conditions are wool, casein, cereal flour and cereal flour gluten, gelatin, wood and lignin. The alkalinity of the reaction medium for optimum results will vary according to the natural product being treated as described hereinafter.

During the processing of wool from fleece to fabric, it is subjected to wetting several times. It has now been discovered that the addition of a cyanamide compound during any of these wetting steps, or in a separate application apart from the manufacture of frabric, imparts several valuable properties to the cloth. Thus, by the process of the invention, it is now possible to make wool substantially permanently rot resistant and moth proof. By rot resistance is meant resistance to bacterial degradation of the various forms of woolen fabrics such as carpets, clothing, and industrial felts, either during the processing of the wool into fabric or during subsequent use. Further benefits of the process are improved dyeability and stretchability of woolen fibers.

It is critical for imparting the foregoing properties to wool that the wool be reacted with the cyanamide compound at a pH of at least 10 and preferably pH 11 or higher. Substantially little or no improvement of resistance of the wool to bacterial disintegration and damage by moths, beetles, and the like occurs at lower pH conditions. The criticality of the high pH treatment is in stark contrast with the prior art. For example, U.S. Patent 2,238,949 to Schlack, suggests treating protein substances such as wool with a cyanamide compound to improve the acid dye fastness and resistance of the wool to pests such as moth larvae, molds and the like. However, it is not appreciated or suggested in the patent that strongly alkaline reaction conditions will substantially improve the foregoing properties since it has been thought that delicate materials such as wool cannot sustain alkaline treatment. See also Nature, 141, 688 (1938) in which it is noted that treating wool with cyanamide will make the wool less pH sensitive to subsequent acid or base treatments but only up to about pH 10. Beyond pH 10 it is said that the cyanamide-treated fibers become so swollen with alkali as to be substantially reduced in their resistance to mechanical extension. So far as is known it has never been recognized that reaction with a cyanamide compound in highly alkaline medium will not cause degradation of the woolen fibers but on the contrary will impart the above mentioned beneficial properties.

The treatment of wool is best practiced by dissolving a cyanamide compound in a highly caustic aqueous solution and soaking the woolen fibers or cloth in the resulting solution for a few minutes up to several hours. Thereafter, the reaction product of wool and cyanamide is neutralized by soaking the woolen fibers for short time in an aqueous acid solution. The resulting woolen fibers when washed in running water and air dried exhibit the proporties above mentioned.

It is only necessary that the wood-treating solution containing caustic and cyanamide compound have a pH of at least 10 or above 7 in the case of the other natural products. Any concentration and form of caustic compound and cyanamide compound which provide this condition will be effective. Thus any strongly basic substance such as sodium hydroxide, potassium hydroxide, and the like may be employed to provide a required high alkaline pH. Likewise, the cyanamide compound may be free cyanamide or an alkali or alkaline earth metal salt of cyanamadie such as $CaNCN$, $Ca\text{-}(HNCN)_2$, $NaHNCN$, or $Na_2NCN$. The time of the cyanamide treatment may be varied widely, e.g., from about 1 to 48 hours, preferably 4 to 24 hours. Likewise, temperature of treatment is not critical. Room temperature has been found effective but this may be varied over wide limits, e.g., from about 0° C. to 100° C.

In substantially the same manner as described above, casein, cereal flour, or cereal flour gluten, and gelatin may be reacted with a cyanamide compound under alkaline pH conditions (at least pH 7) to give nitrogenated, cationic, reaction products. Except for their cationic character, the products, including cyanamide-treated wool, retain most of the properties normally associated with these natural untreated materials. Hence, the cyanamide compound reacted products may be employed in any application for which the natural products are conventionally useful with the additional advantage, among other advantages, that the materials will have an affinity for negatively charged substrates such as cellulose. The treated products are thus useful as beater additives in paper making, in textile sizing, in adhesives, in water purification, ore beneficiation, and the like.

In additon, it has been noted that gelatin when so modified with a cyanamide compound exhibits substantially decreased viscosity in water, thereby facilitating preparation of more highly concentrated solutions, a result hitherto unattainable so far as is known.

The gelatin material is any crude or commercial albumin extract of animal tissues. These substances are to be distinguished from vegetable gelatin which is obtained from various vegetable tissues, for example, agar and algin. The casein includes any of the well-known protein extracts of milk and cheese. The cereal flours include any of the flours of cereal plant seeds such as corn, wheat, soya, and the like, and also the glutens derived from such flours (sometimes called "vegetable casein"). Such flours and glutens are highly proteinaceous, e.g., soya flour gluten is about 50% protein, and the cyanamide reaction contemplated is with the protein rather than other ingredient such as starch. Both crude and refined forms of any of the foregoing proteinaceous materials are contemplated.

The lignin is the well-known extract from wood as distinguished from the cellulosic fibers or pulp derived from wood. However, the invention also includes treatment of lignin-containing cellulose as, for example, in ground wood or mechanical pulp. By virtue of the present invention it has been discovered that lignin in purified or natural form may be nitrogenated by reaction with a cyanamide compound in aqueous dispersion over a wide range of pH. However, it has been found that whereas the extent of nitrogenation remains generally constant in the pH range of about 1–7, reaction at an alkaline pH substantially increases the degree of nitrogenation. For example, at pH 7.0 analysis of the reaction product showed 0.25% nitrogen. At pH 9.0, however, the reaction product contained 3.2% nitrogen and at pH 11.0, 2.16% nitrogen was present. Also, when cellulose containing lignin is treated in the manner of the invention, it is found that considerable nitrogenation occurs as compared with substantially no nitrogenation of the cellulose wood fibers not containing lignin. The present invention contemplates and is restricted to reaction of lignin with a cyanamide compound under alkaline pH conditions, preferably pH 7.5 to 12.0. The treated lignin is useful as a filler in drilling mud applications, plastics manufacture, and in the preparation of cationic dispersants.

It has also been discovered that unground and undigested wood when treated with a highly alkaline aqueous solution of a cyanamide compound and subsequently acidified, dried and painted, exhibits remarkable resistance to paint discoloration. The conditions for treatment of the unground and undigested wood are substantially the same as described above for treatment of wool. By undigested wood is meant wood which has not been subjected to conventional processes for paper manufacture such as cooking in calcium bisulfite, bleaching with chlorine or hydrogen and addition of sizing materials. Any natural, unground, undigested form of wood is suitable for the cyanamide treatment including pine, oak, hemlock, walnut, and the like.

Blood when treated in an alkaline medium with a cyanamide compound such as described above gells into a pudding-like mass. It has been found that blood, liquid or dried and redissolved, is precipitated at substantially any cyanamide compound concentration although effective precipitation requires from about one to ten parts cyanamide compound per part by weight of dried blood. The ability to effectively insolubilize blood is important in removing blood from meat packing waste streams, for example, and the present invention is useful for that purpose.

Further in accordance with the present invention, it has been discovered that aqueous dispersions of certain of the foregoing natural products are preserved against spoilage by treatment with a cyanamide compound without regard to pH control of the mixture. Thus it is found that when about 0.1 to 100% of cyanamide compound based on the dry weight of the natural product is added to 10% aqueous slurries of cereal flour, cereal flour gluten or casein and the samples stored in closed glass bottles at room temperature, preservation against spoilage, as determined by substantial absence of bad odor and fermentation, is extended from several days to more than several months depending upon the concentration of cyanamide compound in the mixture. For example, preservation for at least 30 days is achieved by employing at least about 1.0% of cyanamide compound based on the weight of dry product in the aqueous slurry of casein, cereal flour or cereal flour gluten.

The nature of the invention may be understood more clearly from consideration of the following specific examples which are, of course, only illustrative and are not to be construed as limiting the invention.

EXAMPLE 1

Reaction with wool

Sodium hydroxide (1190 grams) was dissolved in water (5810 grams). Cyanamide (1501 grams) was dissolved in the caustic solution and the mixture was cooled to 10° C. Pieces of wool flannel were allowed to soak in some of the above solution for 17 hours at room temperature. After the cyanamide treatment the pieces of wool were soaked for 1 hour in water adjusted to pH 1.0 with HCl. Finally, the wool was removed from the acid bath, washed well in running water and air-dried.

Pieces of wool treated in the above manner were buried in rich garden loam together with untreated pieces of wool in accordance with ASTM test D 684–45T. After 12 days in the soil at 100° F. and 95% relative humidity, the untreated wool had completely disintegrated while the cynamide-treated fabric remained whole and stong.

Wool flannel samples treated with cyanamide as described above as well as wool samples exposed to the same high pH without cyanamide were placed in containers with black carpet beetles (*Attagenus perceus*) for three weeks. The cyanamide treatment produced a 87.5% reduction in deposited excrement (a measure of the amount of feeding) while caustic alone produced a reduction of only 23.6% as compared with untreated wool. Both the untreated and caustic treated wool were extensively damaged by larval feeding producing numerous holes and sheared fibers. Only light nap feeding occurred on the cyanamide-treated material.

EXAMPLE 2

Reaction with casein

| | G. |
|---|---|
| Cynamide | 600 |
| Sodium hydroxide | 150 |
| Water | 2400 |

Into five hundred gram aliquots of the above solution were slurried 50 grams of casein. The pH of the mixtures was 10.4. All the samples were heated at 40° C. for sixteen hours. As a control, the natural product (50 grams), was slurried in 500 grams of water adjusted to pH 10.5 with sodium carbonate. The control was treated like the reaction mixtures in all cases.

Both the reaction product and the control were precipitated from the reaction solution by the addition of isopropanol in a Waring Blendor. Prior to treatment the casein analyzed 12.63% nitrogen and after reaction showed 13.47% nitrogen. All the treated casein samples showed differences after treatment with cyanamide. Infrared analysis showed that absorption in carbonyl and hydroxyl regions decreased after reaction.

EXAMPLE 3

In substantially the same manner as in Example 2, gelatin, corn flour, corn flour gluten, soya flour, soya flour gluten are treated with cyanamide with substantially equivalent results.

EXAMPLE 4

Reaction with lignin

| | G. |
|---|---|
| Lignin | 35 |
| Cyanamide | 70 |
| Water | 630 |

The cyanamide was dissolved in the water and the lignin was slurried in the solution. One hundred gram aliquots of the slurry were adjusted to pH 1, 3, 5, 7, 9, and 11 and held at 40° C. for four hours. After the reaction, all the samples were adjusted to pH 1.0 and allowed to stand for two hours. Finally the lignin samples were filtered from the slurries and washed well with water.

Analysis of the products for nitrogen gave the following results:

Table I below compares the degree of nitrogenation attained with natural products with respect to nitrogen content of untreated products.

TABLE I

|  | Cellulose (paper) | | Lignin | | Wood (Pine block) | | Ground Wood | |
|---|---|---|---|---|---|---|---|---|
|  | Blank | Treated | Blank | Treated | Blank | Treated | Blank | Treated |
| Reaction time, hrs | | 17 | | 4 | | 17 | | 20 |
| Percent Nitrogen | 0.18 | 0.47 | 0.05 | 3.62 | 0.05 | 2.63 | 0.08 | 1.75 |
| Change in percent nitrogen | | 0.29 | | 3.57 | | 2.58 | | 1.67 |

| Treatment pH: | Percent nitrogen |
|---|---|
| 1.0 | 0.26 |
| 3.0 | 0.18 |
| 5.0 | 0.20 |
| 7.0 | 0.25 |
| 9.0 | 3.62 |
| 11.0 | 2.16 |
| Blank | 0.05 |

Infrared analysis showed increased absorption in the acidic or amidic carbonyl, imino and amino regions with a corresponding decreased absorption in the ether and alcohol regions.

EXAMPLE 5

Treatment of wood

| | G. |
|---|---|
| Cyanamide | 1501 |
| Sodium hydroxide | 1190 |
| Water | 5810 |

Sodium hydroxide was dissolved in water and cooled to 10° C. The cyanamide was dissolved in the cold caustic solution. The temperature ranged from 9 to 12° C. during the cyanamide addition. Six 8" x 2" x 1" pieces of pine were placed in an enamel pan and covered with the above solution. The blocks remained submerged in the cyanamide solution for seventeen hours at 25° C. At the end of the reaction period, the cyanamide solution was poured off and fresh water was added to the pan. Concentrated hydrochloric acid (diluted 1:1) was added to the bath to reduce the pH from 11.3 to 0.8. After two hours the blocks were washed well in water and air dried. Analysis showed 0.54% nitrogen in the cyanamide-treated blocks as compared to 0.05% nitrogen in untreated samples.

One surface of a cynamide-treated block and one surface of an untreated block were given a coat of white, latex house paint. After two weeks immersion in tap water, the control block was badly discolored by resin which apparently had bled through the paint. The cyanamide-treated block showed only slight discoloration.

Two new blocks were painted and immersed in water for nineteen days. Reflectance [1] (whiteness) was lost as follows:

| | Percent |
|---|---|
| Original reflectance | 71 |
| Cyanamide-treated block after 19 days | 47 |
| Control block | 25 |

Substantially the same inhibition of discoloration was noted when the tests were repeated using cyanamide-treated oak and cedar blocks.

[1] Reflectance was measured with a General Electric Recording Spectrophotometer in accordance with ASTM procedure D 125.

EXAMPLE 6

Precipitation of blood with cyanamide 200 grams of dried animal blood were stirred into tap water in a suitable reaction vessel until a smooth brown-black dispersion was formed. The mixture was then diluted to one liter to form a 20% wt./vol. mixture. Sufficient cyanamide was added to water to form a 20% by weight solution. The above blood and cyanamide solutions were then mixed to give concentrations of both materials ranging from 0.1 to 10% (25 samples). After standing for five days at room temperature, precipitate appeared in the cyanamide treated solutions as shown in Table II below.

TABLE II
[DATA IN TABLE REPRESENTS MILLIMETERS IN DEPTH OF PRECIPITATE]

| | Blood Concentration, Percent | | | | |
|---|---|---|---|---|---|
| | 0.1 | 0.5 | 1.0 | 5.0 | 10.0 |
| Cyanamide Concentration, Percent: | | | | | |
| 0 | 0 | 0 | 0 | 0 | 0 |
| 0.1 | Trace | Trace | Trace | 1-2 | 10 |
| 0.5 | Trace | 4 | 10 | 23 | 22 |
| 1.0 | Trace | 7 | 10 | 31 | 50 |
| 5.0 | 2 | 7 | 8 | 25 | (¹) |
| 10.0 | 6 | 10 | 22 | 80 | (²) |

¹ Fluid gell.
² Stiff gell.

EXAMPLE 7

Stabilization of slurries of natural products with cyanamide

Ten percent slurries of corn gluten, casein and soya flour (52% protein) were prepared in deionized water. To each was added cyanamide ranging in concentration from 0.1 to 100% based on the weight of the natural product. All samples were stored in closed glass bottles at room temperature.

Periodically the samples were checked for signs of spoilage such as bad odor and fermentation. Table III shows that the addition of 10–100% of cyanamide to slurries of natural products keeps the materials substantially fresh after more than six months storage.

TABLE III.—PRESERVATIVES EFFECT OF CYANAMIDE ON AQUEOUS SLURRIES OF NATURAL PRODUCTS

| Natural Product | Cyanmide added, percent (Based on dry product) | Sample Age, Days | | | | | | |
|---|---|---|---|---|---|---|---|---|
| | | 1 | 2 | 4 | 7 | 28 | 37 | 180 |
| Casein | 0 | →bad | | | | | | |
| | 0.1 | →bad | | | | | | |
| | 1.0 | | | →bad | | | | |
| | 10.0 | | | | | | | → |
| | 100.0 | | | | | | | → |
| Corn Gluten | 0 | →bad | | | | | | |
| | 0.1 | →bad | | | | | | |
| | 1.0 | | | →bad | | | | |
| | 10.0 | | | | | | | → |
| | 100.0 | | | | | | | → |
| Soya Flour | 0 | →bad | | | | | | |
| | 0.1 | →bad | | | | | | |
| | 1.0 | | →bad | | | | | |
| | 10.0 | | | | | | →bad | |
| | 100.0 | | | | | | | → |

I claim:
1. A method for rendering an undigested solid wood surface resistant to paint discoloration which comprises contacting said surface with an aqueous solution of a compound selected from the group consisting of cyanamide, an alkali metal salt of cyanamide, and an alkaline earth metal salt of cyanamide for at least about one hour, said solution having a pH of at least about 10, and then acidifying the product so produced.
2. The product prepared by the process of claim 1.
3. The product of claim 2 wherein the nitrogen content ranges from about 0.54% to about 2.63% by weight.

References Cited

UNITED STATES PATENTS 3,051,698   8/1962   Elizer _____ 260—212

HOSEA E. TAYLOR, Jr., Primary Examiner

U.S. Cl. X.R.

8—54, 54.2, 128; 117—57, 147; 260—124